(12) United States Patent
Karlsson et al.

(10) Patent No.: US 8,073,448 B2
(45) Date of Patent: Dec. 6, 2011

(54) METHOD AND APPARATUS FOR HANDLING UPLINK TRANSMISSION RATE IN A HANDOVER REGION

(75) Inventors: Patrik Karlsson, Älta (SE); Joe Constantine, Stockholm (SE); Eva Englund, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 408 days.

(21) Appl. No.: 12/300,976

(22) PCT Filed: May 17, 2006

(86) PCT No.: PCT/SE2006/050127
§ 371 (c)(1),
(2), (4) Date: Nov. 14, 2008

(87) PCT Pub. No.: WO2007/133133
PCT Pub. Date: Nov. 22, 2007

(65) Prior Publication Data
US 2009/0170517 A1    Jul. 2, 2009

(51) Int. Cl.
*H04W 36/00* (2009.01)
*H04W 4/00* (2009.01)

(52) U.S. Cl. ........ 455/442; 455/436; 455/437; 370/329; 370/331; 370/232

(58) Field of Classification Search .......... 455/436–444, 455/456.5, 33.2, 561
See application file for complete search history.

(56) References Cited

U.S. PATENT DOCUMENTS

| | | | |
|---|---|---|---|
| 2003/0083069 A1* | 5/2003 | Vadgama | 455/436 |
| 2005/0048975 A1 | 3/2005 | Ranta-Aho et al. | |
| 2005/0094600 A1 | 5/2005 | Zhang et al. | |
| 2005/0220052 A1 | 10/2005 | Uchara et al. | |
| 2005/0249164 A1* | 11/2005 | Kwak et al. | 370/335 |
| 2006/0034223 A1* | 2/2006 | Kim et al. | 370/331 |
| 2006/0092876 A1* | 5/2006 | Kwak et al. | 370/329 |
| 2006/0172739 A1* | 8/2006 | Wigard et al. | 455/442 |
| 2006/0209692 A1* | 9/2006 | Usuda et al. | 370/232 |

FOREIGN PATENT DOCUMENTS
EP   1655907 A1   5/2006
* cited by examiner

*Primary Examiner* — Kent Chang
*Assistant Examiner* — Keith Fang (57) ABSTRACT

The present invention is attained by a network nodes such as radio base stations and radio network controllers and methods m a cellular radio telecommunications network for providing a radio air interface to at least a first mobile terminal in at least a first radio coverage area, hereinafter referred to as cell, comprising a receiver for receiving uplink packet data from the at least one mobile terminal. The radio base station further comprises a rate limiter provided to limit the uplink packet data transmission rate from the at least first mobile terminal during handover between the at least first cell and another cell.

19 Claims, 4 Drawing Sheets

METHOD AND APPARATUS FOR HANDLING UPLINK TRANSMISSION RATE IN A HANDOVER REGION

TECHNICAL FIELD

The present invention relates to the field of radio telecommunications. More specifically, the present invention relates to efficient handover for a user terminal in a telecommunications system.

BACKGROUND OF THE INVENTION

The present invention finds application particularly in third-generation networks of Wideband Code division Multiple Access (WCDMA) type. However, the techniques may be applicable also in connection with other types of radio networks, such as GSM, CDMA etc.

In radio telecommunications networks a base station or a node B as it is named in WCDMA provides a radio, or air interface to a mobile user terminal, or user equipment. This radio interface is called the Uu interface in WCDMA. The node B is connected to a Radio Network Controller (RNC) which is the network element responsible for control of radio resources in the Universal Mobile Telephony Network (UMTS) Radio Access Network (UTRAN). The Node B and the RNC are connected through the Iub interface. The RNC is in turn connected to a Core Network (CN) which may comprise a number of different network nodes, such as MSC/VLR, SGSN etc.

In third-generation radio access networks increased transmission rates has been a primary goal and new protocols and techniques for achieving increased transmission rates has been developed. A High Speed Downlink Packet Access (HSDPA) protocol has been standardised in WCDMA release 5, and recently it has been complemented by a High Speed Uplink Packet Access (HSUPA) protocol in WCDMA release 6.

In HSUPA different user equipment is assigned different transmission rates, or Grants, ranging from 0 kbps up to 5.76 Mbps. That is, one user may have a larger Grant than another. To support the transmissions, hardware in Node B is allocated in hardware pools and hardware resources are allocated to a particular user to support the transmission rate required. The larger the transmission rates, the more hardware resources required, as well as air interference generated in the Uu interface, and load on the Iub link.

When an Enhanced Dedicated Channel (E-DCH) user, that is a user having a grant for HSUPA transmission, is in handover more than one RBS receives the uplink data transmission from the user equipment. The data received from the at least two RBS nodes are sent to the RNC where they are combined. One of the RBS nodes, the node having the best radio characteristics, is a serving node and the other RBS nodes are non-serving nodes.

The serving node can, by sending absolute grants (AG) or relative grants (RG), adjust the scheduled transmission rate for the user equipment, that is, the serving RBS can both increase and decrease the scheduled rate, while the non-serving node can only send relative grants to reduce the transmission rate. There is no communication between the two RBS nodes, so the serving node does not have information relating to the particular capacity circumstances for the non-serving node.

SUMMARY OF THE INVENTION

The serving node is in control of the adjustment of the transmission rate for the user equipment and has knowledge of available hardware, as well as other resources, and can thus adapt scheduled grants to the available resources.

This is however not true for the non-serving RBS, which simply is faced with the fact of a particular user equipment sending data with a particular transmission rate. This may of course cause problems in the non-serving RBS, since it, for instance, may not be able to allocate enough resources, such as hardware to support the transmission rate.

Further more, even if hardware is available the hardware may take significant time to allocate reducing efficiency and quality of service. As long as the non-serving node is unable to decode the data due to lack of resources diversity advantages are also lost.

If the non-serving node is unable to cope with the rate it can send a RG ordering the user equipment to reduce its transmission rate. However, since the serving cell is not aware of that the non-serving cell has reduced the transmission rate for the user equipment, the serving cell will have hardware allocated for the larger transmission rate, which of course is a waste of resources since the user equipment is not utilising all of the allocated hardware.

It is an object of one aspect of the present invention to provide such apparatus and method that provides efficient handover for user equipment in a radio telecommunication network One object according to an aspect of the invention is to provide efficient resource utilization during handover in a radio telecommunications system.

One object according to an aspect of the invention is to provide high end-user performance, to reduce latency and increase overall throughput for user equipment in a radio telecommunications network These objects among others are, according to one aspect of the present invention, attained by a radio base station in a cellular radio telecommunications network for providing a radio air interface to at least a first mobile terminal in at least a first radio coverage area, hereinafter referred to as cell, comprising a receiver for receiving uplink packet data from the at least one mobile terminal. The radio base station further comprises a rate limiter provided to limit the uplink packet data transmission rate from the at least first mobile terminal during handover between the at least first cell and another cell.

These objects among others are, according to another aspect of the present invention, attained by a method in a radio base station provided in a cellular radio telecommunications network comprising a radio air interface between the radio base station and at least a first mobile terminal in at least a first radio coverage area, hereinafter referred to as cell, the radio base station comprises a receiver for receiving uplink packet data from the at least one mobile terminal. The method comprises the step to limit the uplink packet data transmission rate from the at least first mobile terminal during handover between the at least first cell and another cell.

The term mobile terminal is used synonymously with the term user equipment in this description and is defining a piece of equipment having capabilities to communicate over an air interface.

By limiting the transmission rate for a mobile terminal during handover it can be ascertain that the negative impacts of a mobile terminal, having high transmission rate, entering a cell with normal to high load, can be minimized.

By temporarily limiting the transmission rate, specifically during handover, link load and hardware utilisation in a node which has limited possibilities to react to and affect the transmission rate, handover can be performed in an orderly fashion. The handover can then be performed without unnecessary negative impacts on users already located in the cell, while at the same time continue the transmission for the mobile terminal entering the cell.

The transmission rate may, according to one embodiment more closely disclosed below, be limited by sending a new grant to the user with a reduced transmission rate allowance.

These objects among others are, according to another aspect of the present invention, attained by a radio network controller in a cellular radio telecommunications network connected to a first radio base station and at least a second radio base station providing a radio air interface to mobile terminals located in a first cells associated with the first radio base station and a second cell associated with the second radio base station, the radio network controller is provided to receive uplink packet data from at least one mobile terminal located in any of the cells via the radio base stations. The radio network controller is provided to receive a message from the first radio base station indicating that a specific transmission rate for a mobile terminal entering the first cell can not be supported.

These objects among others are, according to another aspect of the present invention, attained by a method in a radio network controller provided in a cellular radio telecommunications network, the radio network controller is connected to a first radio base station and at least a second radio base station providing a radio air interface to mobile terminals located in a first cells associated with the first radio base station and a second cell associated with the second radio base station, the radio network controller is provided to receive uplink packet data from at least one mobile terminal located in any of the cells via the radio base stations. The method comprises the step to receive a message from the first radio base station indicating that a specific transmission rate for a mobile terminal entering the first cell can not be supported.

These objects among others are, according to another aspect of the present invention, attained by a radio base station in a cellular radio telecommunications network for providing a radio air interface to at least a first mobile terminal in at least a first radio coverage area, hereinafter referred to as cell, comprising a receiver for receiving uplink packet data from the at least one mobile terminal, and a data communication link to a radio network controller. The radio base station further comprises a transmission rate support detector provided to detect if a transmission rate for the at least first mobile terminal entering the cell can be supported, and wherein the radio base station is provided to send a message to the radio network controller if the transmission rate can not be supported.

By receiving in the radio network controller (RNC), a message sent from a radio base station (RBS) indicating that the RBS can not support a specific transmission rate, the RNC is made aware of the current network situation and may perform one or several of a number of different tasks. The most simple one is to only register the report for further analysis and possible later adaptation of the network configuration to minimize such events.

These objects among others are, according to another aspect of the present invention, attained by a radio base station, hereinafter referred to as RBS, in an wideband code division multiple access, hereinafter referred to as WCDMA, radio telecommunications network comprising means for receiving a high speed uplink packet access, hereinafter referred to as HSUPA, transmission from a user equipment, hereinafter referred to as UE, located in a cell associated with the RBS, wherein the RBS is receiving packet transmission from the UE as a non-serving cell with a first transmission rate. The RBS comprises means for detecting that the RBS is unable to support the first transmission rate from the UE due to either lack of Iub link capacity or lack of hardware capacity, and means for sending a relative grant, hereinafter referred to as RG, to the UE, indicating that the UE should reduce its transmission rate in dependence of the detection.

According to the standard WCDMA release 6, which specifies HSUPA, a non-serving cell is only allowed to send a RG if the air interface in the cell can not cope with the transmission rate a new user entering the cell is using. That is, if the interference is too large. The present inventors has surprisingly discovered that many benefits may be achieved if the non-serving cell also would send a RG reducing the transmission rate for a user if the Iub link load is too large or if the non-serving cell has a lack of available hardware resources.

If an RG is sent also under these circumstances the non-serving cell may be able to support the lower transmission rate and the user may be able to continue to transmit data, albeit with lower rate.

According to one variant of an aspect of the invention the radio base station is provided to receive measurement results from a network node indicating that at least a second cell has acceptable reception characteristics, and the radio base station is provided to transmit a message to the at least first mobile terminal limiting the scheduled rate to a specific maximum handover transmission rate upon the indication.

When the RBS receives notification from a network node, such as the RNC, that another cell has acceptable reception characteristics, that is, the RBS is made aware of that at least one non-serving cell is also receiving the transmission from the mobile terminal, the serving RBS sends a new grant to the mobile terminal which is less than or equal to the maximum handover transmission rate defined at the RBS. That is, the UE is not aware of any specific maximum handover transmission rate, but is limited by the new grant sent by the RBS.

The measurement results may simply be an indication that the mobile terminal receives signals from another cell with better signal to noise ratio than a specified threshold, that is, the measurement results as such may not necessarily be sent to the RBS. The acceptable receptions characteristics are then the above mentioned better signal to noise ratio.

The maximum handover transmission rate is the largest rate the RBS is allowed to give to a user in handover. The RBS may of course give less transmission rate if it, for one reason or another according to common evaluation, finds that the maximum handover transmission rate is too large.

If the user currently is not transmitting with a rate which is over the maximum handover transmission rate, the RBS may set a flag indicating that the mobile terminal is in handover and should not be given a higher grant than the maximum handover transmission rate if the mobile terminal later sends a request for increased rate.

The maximum handover transmission rate is conveniently set so that a non-serving cell can easily support it.

According to one variant of an aspect of the invention the radio base station comprises a hardware pool comprising hardware resources for allocation to specific mobile terminals and provided for supporting the reception of packet data from mobile terminals located in the cell, and the radio base station is provided to reserve enough hardware resources to support the maximum handover transmission rate at call set-up for new mobile terminals entering the cell.

If the RBS reserves hardware for a new mobile terminal entering a cell at call set-up, radio link set-up or terminal transmission detection it is guaranteed that the RBS at least can support a minimal rate. Further more, when the mobile terminal in a later stage start to send uplink packet data some hardware are already allocated and the transmission may be started without delay otherwise associated with hardware allocation.

According to one variant of an aspect of the invention the radio base station comprises a data communication link to a radio network controller and where the radio base station is provided to send packet data received from the at least first mobile terminal over the data communications link to the radio network controller, and the radio network controller is provided to set the maximum handover transmission rate.

According to one variant of an aspect of the invention the radio base station is provided to receive the maximum handover transmission rate in a message sent from the radio network controller, at initiation of the radio base station, at call set-up, in dependence of network load or in dependence of the time of day.

Since the RNC has control over a number of RBSs and therefore has a better understanding of the network characteristics it can be beneficial to let the RNC set the maximum handover transmission rate. Alternatively the maximum handover transmission rate can be set by an operator.

By letting the RNC determine the maximum handover transmission rate the RNC may for instance take the current network situation in consideration when determining how large the maximum handover transmission rate should be. In a situation where, for instance, few users are present in the immediate network neighbourhood the maximum handover transmission rate can be set to a higher value. When more users appear, or during peak hours, the RNC may determine to reduce the value.

The immediate network neighbourhood can for instance be the area controlled by the RNC, another suitable grouping of RBS nodes connected to the RNC or a specific grouping of cells.

According to one variant of an aspect of the invention the RNC sets the maximum handover transmission rate per user, for instance at call set-up. Alternatively, it may be set per RBS for instance at start-up, or when a particular traffic situation occurs, or in dependence of the time of day.

According to one variant of an aspect of the invention the radio base station is provided to send a message to the radio network controller indicating that the radio base station is unable to support a transmission rate for a mobile terminal entering the cell.

According to one variant of an aspect of the invention the radio base station is unable to support the transmission rate if any condition in a group of conditions is valid, the group of conditions including: the load on the air interface is too large; the load on the data link to the radio network controller is too large; it is not possible to allocate enough hardware; free hardware resources in the pool of hardware resources is below a threshold.

By reporting to the RNC that an RBS can not support a particular transmission rate the RNC is made aware of the situation and may for instance adapt the maximum handover transmission rate for the RBS currently serving the mobile terminal.

According to one variant of an aspect of the invention a transmission rate estimator is provided to estimate the actual transmission rate utilized by the at least first mobile terminal, and the radio base station is provided to send a message indicating a maximum transmission rate to be used to the at least first mobile terminal, where the maximum transmission rate is equal to or less than the estimated transmission rate.

The RBS can estimate the rate limit of a terminal by monitoring the E-TFCI received on the E-DPCCH. By monitoring the maximum transport format used it can estimate the rate limit the UE is limited to. For example, if a UE is sending in 0, 120, 380, 380, 0, 0, 140 kbps in the TTI:s it can be estimated that the UE is limited to 380 kbps. The UE will use the allowed peak rate in a TTI if it has data to transmit. Only if it does not have data, or is power limited, it will use a lower rate. Alternatively, the estimation can be performed with a more robust estimate by doing the rate estimate over more TTI:s at the expense of rapid reaction.

If the serving RBS has issued an absolute grant for a particular transmission rate, and this rate can not be supported by a non-serving RBS, the non-serving RBS will send a relative grant reducing the transmission rate. By providing a transmission rate estimator the serving RBS estimates the utilised rate by the mobile terminal and detects that the mobile terminal is not using its entire granted rate. This can have many reasons, of which one is mentioned above.

However, whatever the reason, the serving RBS can now send a new grant in dependence of the estimated used rate. For instance the serving RBS may resend the previously grant, assuming that the mobile terminal for some reason did not "hear" the increased grant sent previously. If the mobile terminal still does not increase its rate, or soon after the grant has been sent adapt its transmission rate to a lower rate, the serving RBS may send a new lower grant, since the RBS may conclude that the terminal may be in handover and therefore can be rate limited by another non-serving cell, does freeing occupied resources, for instance hardware, not utilised.

According to one variant of an aspect of the invention the radio network controller is provided to detect that the mobile terminal is connected the second radio base station through the second cell, and the radio network controller is provided to send a message to the second radio base station indicating a maximum handover transmission rate to be used by the mobile terminal during handover.

When the RNC receives a message indication that a transmission rate can not be supported by a first RBS being a non-serving RBS, it may, according to this variant of the invention, send a message to the second RBS, being the serving RBS, ordering the second RBS to limit the transmission rate for the mobile terminal during handover, by providing a maximum rate limit.

Thus, the handover can be achieved in a smooth way, since the transmission rate is reduced to a level which both the first and the second RBS can cope with.

According to one variant of an aspect of the invention the maximum handover transmission rate is less than or equal to the maximum transmission rate that can be supported by the first radio base station.

According to one variant of an aspect of the invention the radio base stations are provided to reserve resources to support the maximum handover transmission rate for each mobile terminal entering the cell.

According to one variant of an aspect of the invention the resources are selected from a group of resources comprising: air interface capacity, link capacity between the radio base stations and the radio network controller, hardware resources in the radio base station.

By reserving enough hardware in the RBS to support the maximum handover transmission rate, the RBS will always be able to at least support this rate.

According to one variant of an aspect of the invention the specific transmission rate is any of: the transmission rate used by the mobile terminal when entering the cell, the maximum transmission rate granted to the mobile terminal, the maximum handover transmission rate, zero kpbs.

According to one variant of an aspect of the invention the message from the first radio base station comprises an indication of the maximum transmission rate which can be supported.

According to one variant of an aspect of the invention the radio base station and the radio network controller are compliant to the WCDMA standard and the uplink packet data is compliant to HSUPA in the WCDMA release 6 standard.

The presently described aspects and variants of the invention are particularly useful in a WCDMA environment, and even more so for the HSUPA application in WCDMA release 6.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 4, which are given by way of illustration only, and thus are not limitative of the present invention.

DETAILED DESCRIPTION OF DIFFERENT ASPECTS OF THE INVENTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
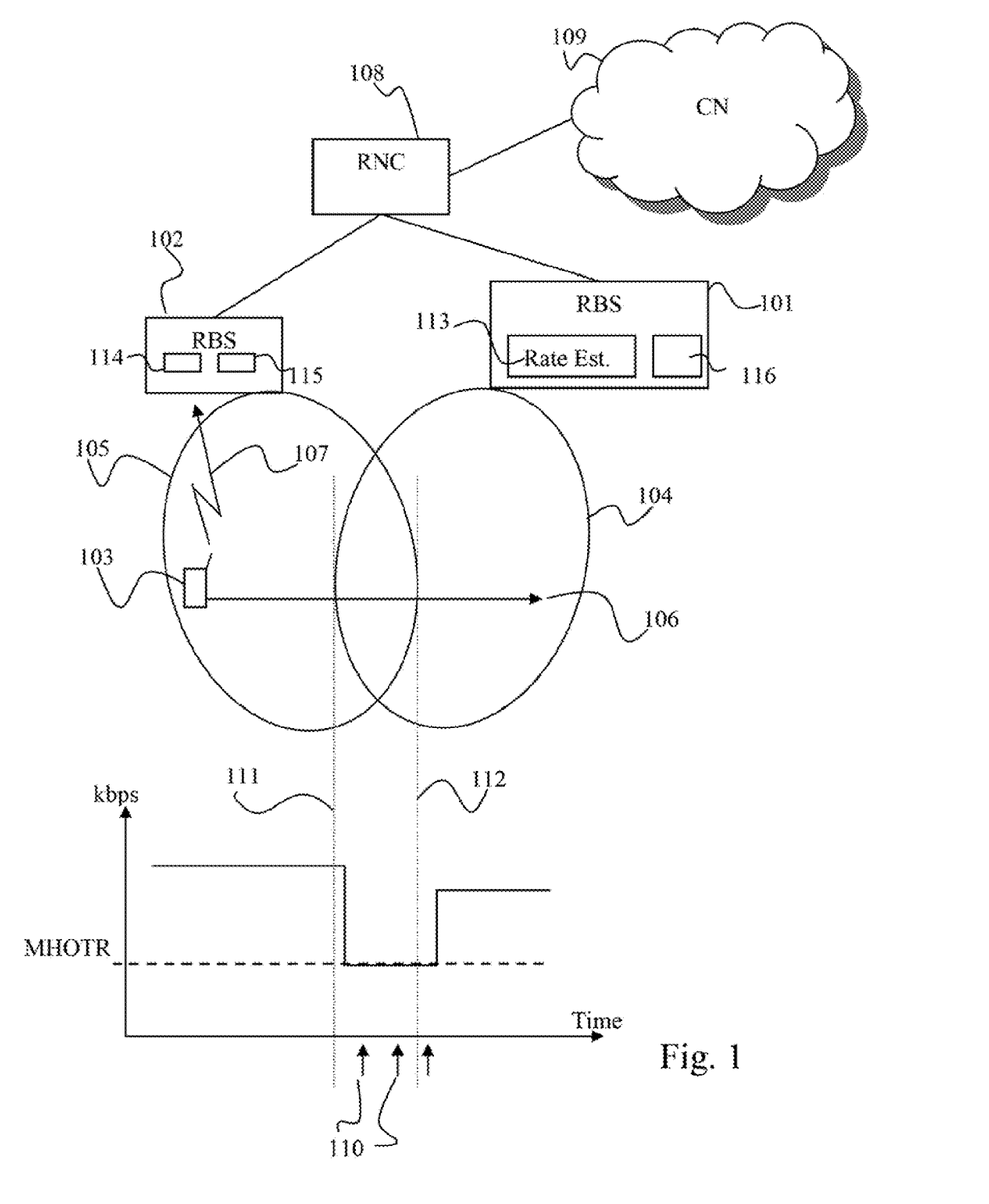
FIG. 1 is a schematic block diagram according to one aspect of the invention illustrating a handover.

FIG. 1 is a schematic block diagram according to one variant of the invention illustrating a handover between a first RBS 101, and associated first cell 104, and a second RBS 102, and associated second cell 105, of a user equipment, or mobile terminal 103. The first RBS 101 is the receiving RBS, and the second RBS 102 is the originating RBS. It should be clear to the skilled man that each RBS may have more cells associated, but only one is shown for clarity.

The first and second RBS nodes are connected to an RNC 108, which in turn is connected to a core network 109.

The UE 103 is located in the second cell 105 at first point of time and are moving towards the first cell 104 as is indicated by an arrow 106. The UE 103 has an established HSUPA connection to the second RBS 102 indicated by a flash arrow 107. The second RBS 102 has allocated hardware resources 114 for the UE 103 and is thus the serving RBS. In the lower part of FIG. 1 is a chart indicating the transmission rate in kilo bits per second (kbps) for the UE 103 over time.

When the UE 103 gets closer to the first cell 104, it will pass a point where the signal to noise ratio for signals to the first RBS 101 is acceptable. This point is indicated by a vertical dotted line 111. The UE 103 will send a measurement report to the RNC 108 indicating that the first RBS 101 has acceptable reception characteristics. The first RBS 101 will at this point assume to role of a non-serving RBS, and thus try to receive HSUPA data transmission from the UE 103.

The second RBS 102 receives a message from the RNC 108 that the UE 103 is in handover and a rate limiter 115 will thus adjust the transmission rate to the MHOTR by sending a new grant to the UE 103. The UE 103 will then start to send requests for increased rate 110 to the serving RBS 102 assuming the conditions for this are fulfilled. These are however ignored since the UE 103 is in handover and already has the highest allowed rate, namely the maximum handover transmission rate, MHOTR.

As the UE 103 continues its movement along the arrow 106 the handover will be completed, at a point indicated by a vertical dotted line 112, where the first RBS 101 assumes the role of serving RBS. Assuming the UE 103 still has data to send using the HSUPA connection, the UE 103 will send a request for increased rate to the first RBS 101. The first RBS may then send a new grant to the UE 103, increasing the rate for the UE 103, as is shown in FIG. 1.

As is indicated in the chart, this rate was not as large as it was for the second RBS 102, which may for instance depend on capacity limitations of hardware resources 116 in the first RBS 101. Thus if the larger rate would have been maintained during the handover, the first RBS 101 may not have been able to support the larger rate and in worst case the connection could have been lost. Thus, by reducing the transmission rate during the handover a safe and orderly handover is achieved, while maintaining transmission.

According to one aspect of the present invention the first RBS 101 comprises a rate estimator 113 for estimating the transmission rate used by the UE 103 when entering the first cell 104. If the first RBS 101, based on the estimations, detects that the current transmission rate used by the UE 103 can not be supported a message is sent to the RNC 108, which may take appropriate actions, such as sending a message to the second RBS 102 as will be described below.

Figure 2:
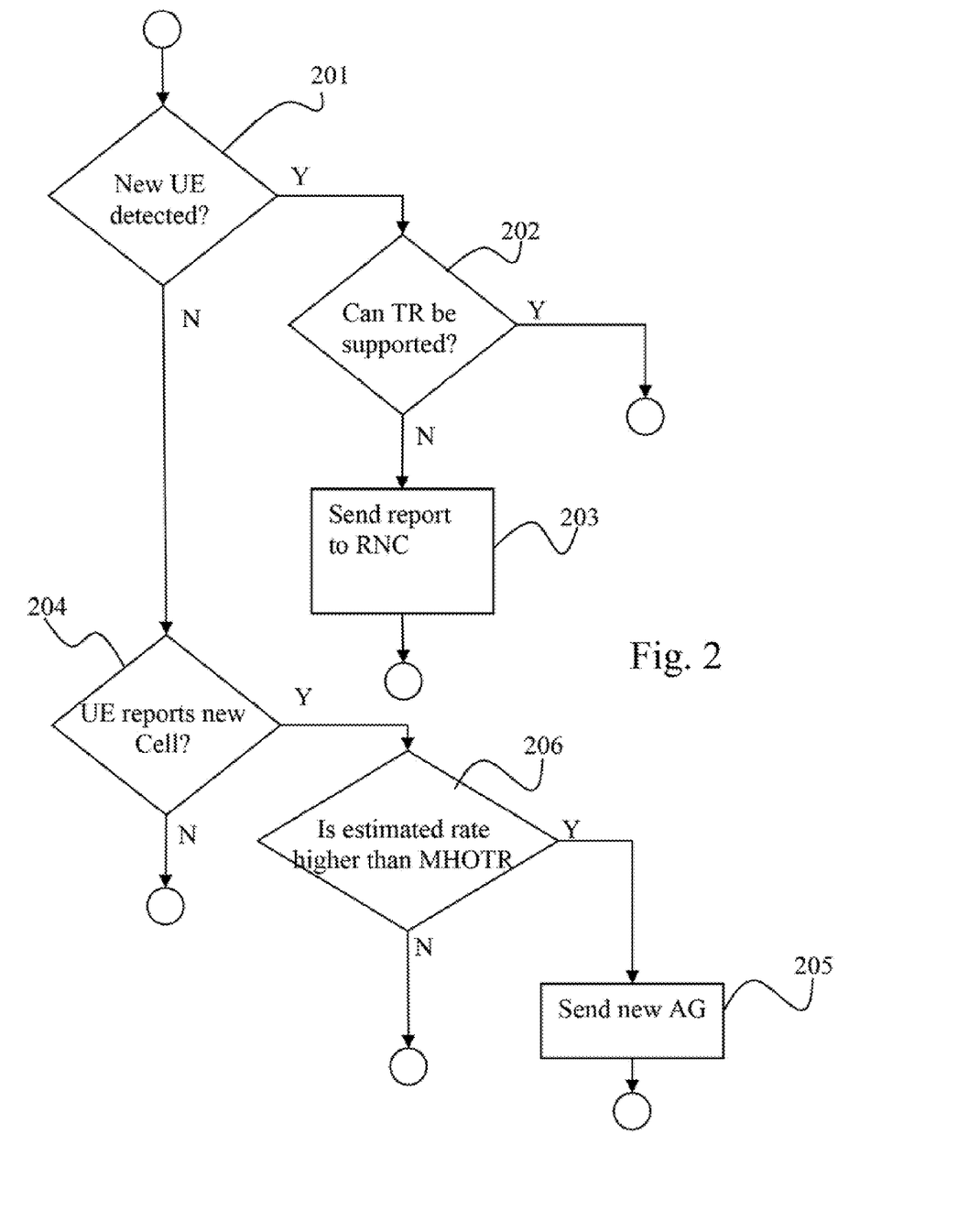
FIG. 2 is a schematic flow diagram according to one aspect of the invention.

FIG. 2 is a schematic flow diagram according to one variant of the present invention of a method in a radio base station. Since an RBS must operate both as a serving and as a non-serving RBS, both situations must be catered for. If a new UE is detected, for instance if a transmission from a UE is detected 201, a check is performed to determine if the transmission rate (TR) of the UE can be supported 202. If the transmission rate can not be supported a report is sent to the RNC 203

If a UE reports a new cell 204 and if the estimated transmission rate is higher than the maximum handover transmission rate 206, the RBS sends a new absolute grant to the UE 205 reducing the scheduled grant to substantially the maximum handover transmission rate.

Figure 3:
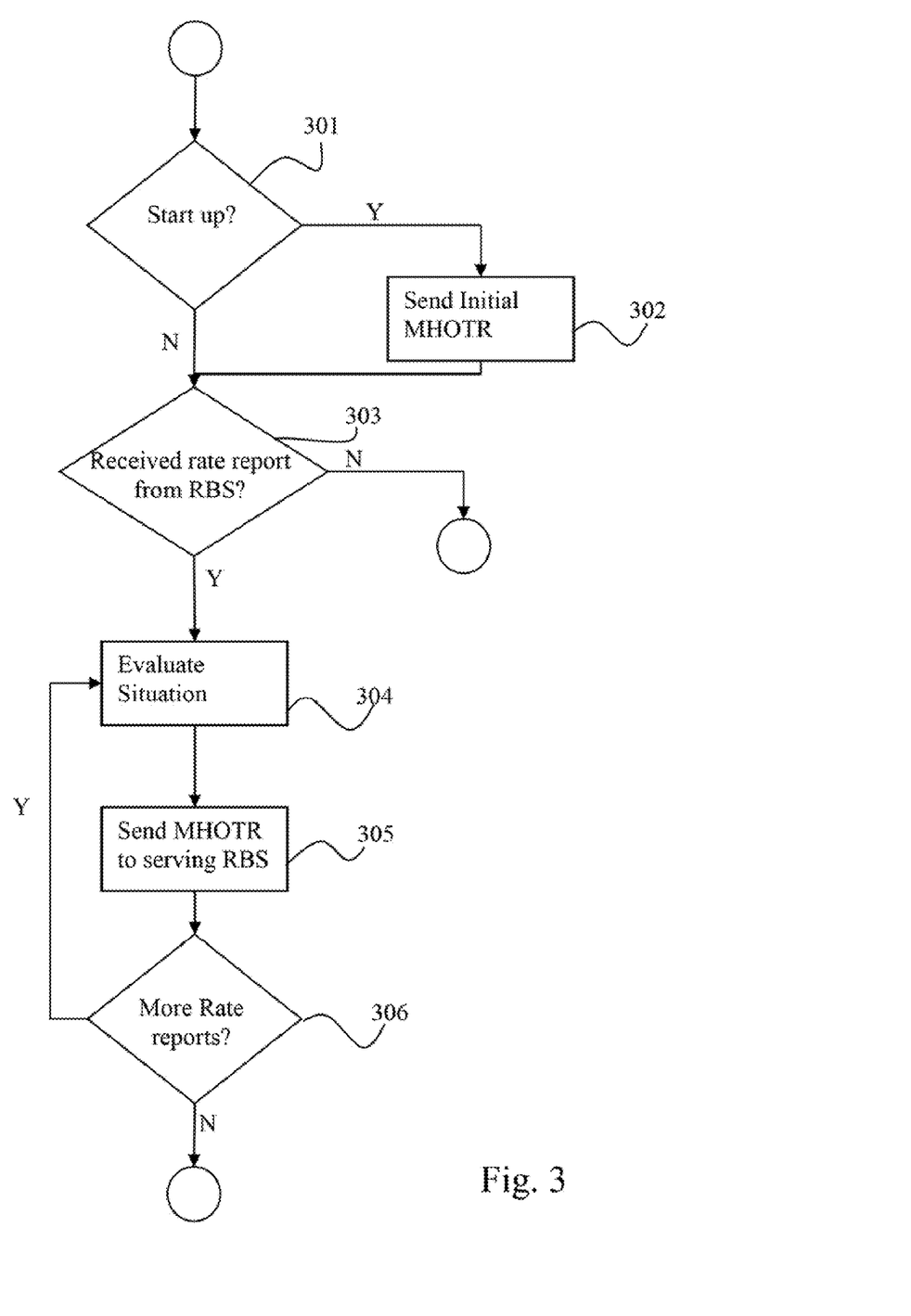
FIG. 3 is a schematic flow diagram according to one aspect of the invention.

FIG. 3 is a schematic flow diagram according to one variant of the present invention of a method in a radio network controller. Initially a check 301 is made to verify if either the RNC or the RBS is started up, so that an initial maximum handover transmission rate should be sent 302 to the RBS. According to one variant of the invention this MHOTR can be set by an operator.

If rate reports are received 303 from an RBS connected to the RNC, currently operating as a non-serving RBS, the situation is evaluated 304 for the particular non-serving RBS and the particular network characteristics. Depending on the evaluation a rate limit, that is a MHOTR, is sent to the corresponding serving RBS 305. In step 306 a check is made to verify of there are any pending rate reports from non-serving RBS nodes.

Figure 4:
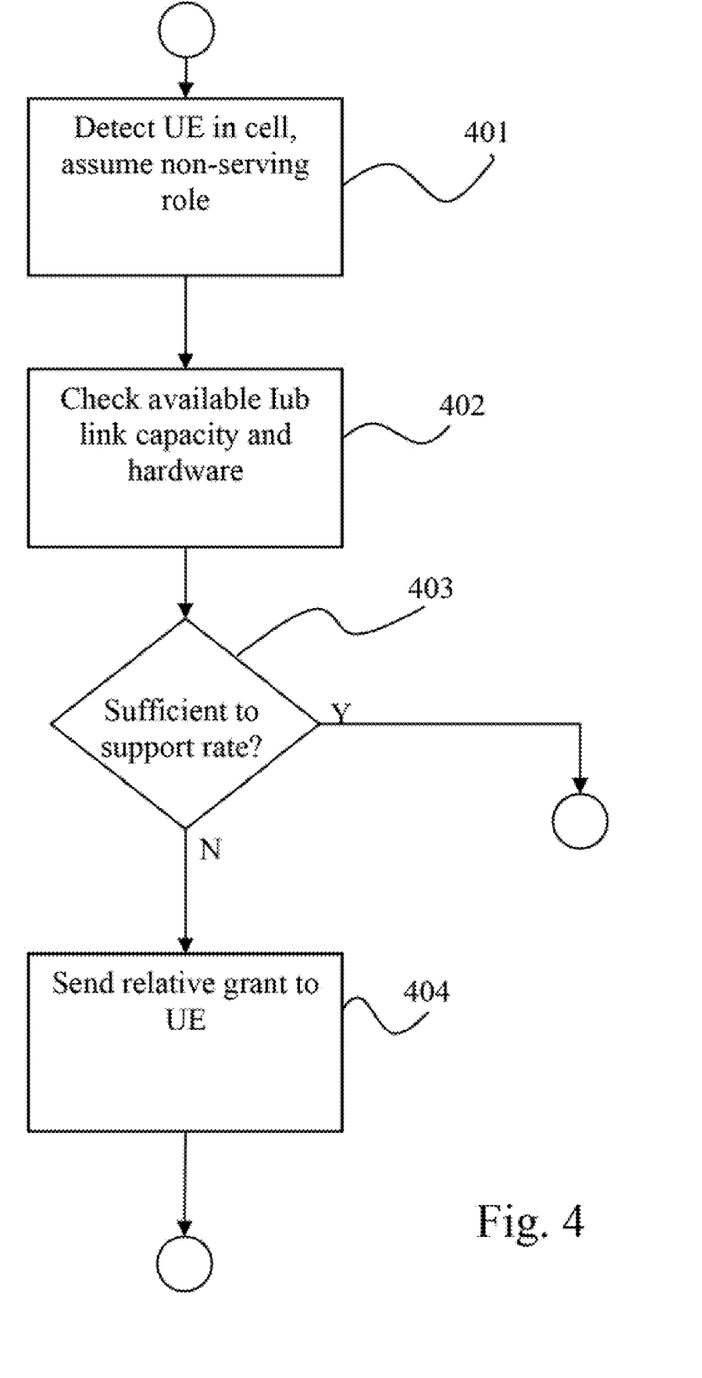
FIG. 4 is a schematic flow diagram according to one aspect of the invention.

FIG. 4 is a schematic flow diagram according to one aspect of the present invention. A message is received from the RNC indicating that the RBS should receive transmissions from the UE and the RBS thus assume the role of a non-serving RBS 401. A check is performed 402 regarding the available Iub link capacity and hardware capacity in relation to the current rate used by the UE. The current rate could for instance be estimated by a rate estimator.

If the capacity is not enough 403 to support the transmission rate a relative grant is sent to the UE ordering a decrease in transmission rate 404.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A serving radio base station in a cellular radio telecommunications network which includes a radio network controller and a non-serving radio base station, the serving radio base station for providing a radio air interface to at least a first mobile terminal in at least a first radio coverage area, hereinafter referred to as first cell, comprising:
  a receiver for receiving uplink packet data from said at least one mobile terminal,
  the serving radio base station is provided to receive a maximum handover transmission rate from the radio network controller, wherein the maximum handover transmission rate is a largest rate the serving radio base station is allowed to give a mobile terminal in handover, and wherein the maximum handover transmission rate is set so that the non-serving radio base station can support the maximum handover transmission rate,
  a rate limiter provided to limit the uplink packet data transmission rate from said at least first mobile terminal during handover between said at least first cell and another cell associated with the non-serving radio base station to substantially said maximum handover transmission rate, and
  the serving radio base station is provided to receive requests for increased uplink packet data transmission rate from the at least first mobile terminal during the handover and ignores the received requests since the at least first mobile terminal already has a highest allowed rate namely the maximum handover transmission rate.

2. The serving radio base station of claim 1, wherein said serving radio base station is provided to receive measurement results from the radio network controller indicating that at least a second cell has acceptable reception characteristics to receive transmissions from said at least the first mobile terminal, and
  said serving radio base station is provided to transmit a message to said at least first mobile terminal limiting the scheduled rate to the specific maximum handover transmission rate for said at least first mobile terminal upon said indication.

3. The serving radio base station of claim 1, further comprising
  a hardware pool comprising hardware resources for allocation to specific mobile terminals and provided for supporting the reception of packet data from mobile terminals located in said cell, and
  said serving radio base station is provided to reserve enough hardware resources to support said maximum handover transmission rate at call set-up for new mobile terminals entering said cell.

4. The serving radio base station of claim 3, further comprising:
  a data communication link to the radio network controller and said serving radio base station is provided to send packet data received from another mobile terminal over said data communications link to said radio network controller, and
  said radio network controller is provided to set said maximum handover transmission rate.

5. The serving radio base station of claim 4, wherein said serving radio base station is provided to receive said maximum handover transmission rate in a message sent from said radio network controller, at initiation of said serving radio base station, at call set-up, in dependence of network load or in dependence of the time of day.

6. The serving radio base station according to claim 4, wherein
  said serving radio base station is provided to send a message to said radio network controller indicating that said radio base station is unable to support a transmission rate for the another mobile terminal entering said at least first cell.

7. The serving radio base station of claim 6, wherein said serving radio base station is unable to support said transmission rate if any condition in a group of conditions is valid, said group of conditions including:
  the load on said air interface is too large, to load on the data link to said radio network controller is too large, it is not possible to allocate enough hardware, and free hardware resources in said pool of hardware resources is below a threshold.

8. The serving radio base station of claim 1, comprising a transmission rate estimator provided to estimate the actual transmission rate utilized by said at least first mobile terminal, wherein
  said radio base station is provided to send a message to said at least first mobile terminal limiting the scheduled rate to a maximum transmission rate, where said maximum transmission rate is equal to or less than said estimated transmission rate.

9. The serving radio base station of claim 1, wherein said radio base station and said radio network controller are compliant to the WCDMA standard and said uplink packet data is compliant to HSUPA in the WCDMA release 6 standard.

10. A method in a serving radio base station provided in a cellular radio telecommunications network which includes a radio network controller and a non-serving radio base station, the serving radio base station providing a radio air interface to at least a first mobile terminal in at least a first radio coverage area, hereinafter referred to as first cell,
  receiving uplink packet data from said at least one mobile terminal,
  receiving a maximum handover transmission rate from the radio network controller, wherein the maximum handover transmission rate is a largest rate the serving radio base station is allowed to give a mobile terminal in handover, and wherein the maximum handover transmission rate is set so that the non-serving radio base station can support the maximum handover transmission rate,
  limiting the uplink packet data transmission rate from said at least first mobile terminal during handover between said at least first cell and another cell associated with the non-serving radio base station to substantially said maximum handover transmission rate, and receiving requests for increased uplink packet data transmission rate from the at least first mobile terminal during the handover and ignoring the received requests since the at least first mobile terminal already has a highest allowed rate namely the maximum handover transmission rate.

11. The method of claim 10, comprising the further steps of:
receiving measurement results from the radio network controller indicating that at least a second cell has acceptable reception characteristics for receiving data transmissions from said at least first mobile terminal, and
transmitting a message to said at least first mobile terminal limiting the scheduled rate to a specific maximum handover transmission rate upon said indication.

12. The method of claim 10, further comprising
allocating to specific mobile terminals and supporting the reception of packet data from mobile terminals located in said cell utilizing a hardware pool comprising hardware resources, and
reserving enough hardware resources to support said maximum handover transmission rate at call set-up for new mobile terminals entering said cell.

13. The method of claim 10, further comprising:
utilizing a data communications link to a radio network controller
sending packet data received from said at least first mobile terminal over said data communications link to said radio network controller, and
receiving said maximum handover transmission rate in a message from said radio network controller.

14. The method of claim 10, comprising the further steps of:
detecting if said serving radio base station is unable to support transmission rate for a mobile terminal entering said at least first cell, and
sending a message to said radio network controller if said radio base station is unable to support said transmission rate.

15. The method of claim 14, wherein
said serving radio base station can not support said transmission rate if any condition in a group of conditions is valid, said group of conditions comprising:
a load on said air interface is too large, a load on the data link to said radio network controller is too large, it is not possible to allocate enough hardware, free hardware resources in said pool of hardware resources is below a threshold.

16. The method of claim 10, comprising the further steps of:
estimating the actual transmission rate utilized by said at least first mobile terminal, and
sending a message indicating a maximum transmission rate to be used, which is equal to said estimated transmission rate, to said at least first mobile terminal.

17. The method of claim 10, wherein
said serving radio base station and said radio network controller are compliant to the WCDMA standard and said uplink packet data is compliant to HSUPA in the WCDMA release 6 standard.

18. A telecommunications network comprising:
a radio network controller;
a serving radio base station; and
a non-serving radio base station;
the serving radio base station comprising:
a receiver for receiving uplink packet data from said at least one mobile terminal in a first cell;
the serving radio base station is provided to receive a maximum handover transmission rate from the radio network controller, wherein the maximum handover transmission rate is a largest rate the radio base station is allowed to give a mobile terminal in handover, and wherein the maximum handover transmission rate is set so that the non-serving radio base station can support the maximum handover transmission rate,
a rate limiter provided to limit the uplink packet data transmission rate from said at least first mobile terminal during handover between said first cell and a second cell associated with the non-serving radio base station to substantially said maximum handover transmission rate, and
the serving radio base station is provided to receive requests for increased uplink packet data transmission rate from the at least first mobile terminal during the handover and ignores the received requests since the at least first mobile terminal already has a highest allowed rate namely the maximum handover transmission rate;
the non-serving radio base station comprising a hardware pool including hardware resources for allocation to specific mobile terminals and provided for supporting the reception of packet data from mobile terminals located in said second cell, and
the non-serving radio base station is provided to reserve enough hardware resources to support said maximum handover transmission rate at call set-up for new mobile terminals entering said second cell.

19. A serving radio base station in a cellular radio telecommunications network which includes a radio network controller and a non-serving radio base station, the serving radio base station for providing a radio air interface to at least a first mobile terminal in at least a first radio coverage area, hereinafter referred to as first cell, comprising:
a receiver for receiving uplink packet data from said at least one mobile terminal,
the serving radio base station is provided to receive a maximum handover transmission rate from the radio network controller, wherein the maximum handover transmission rate is a largest rate the serving radio base station is allowed to give a mobile terminal in handover, and wherein the maximum handover transmission rate is set so that the non-serving radio base station can support the maximum handover transmission rate,
a rate limiter provided to limit the uplink packet data transmission rate from said at least first mobile terminal during handover between said at least first cell and another cell associated with the non-serving radio base station to substantially said maximum handover transmission rate, and
the serving radio base station is provided to receive requests for increased uplink packet data transmission rate from the at least first mobile terminal during the handover and ignores the received requests if allowing would mean that the maximum handover transmission rate is passed.

* * * * *